Sept. 22, 1931.  F. GENTRY  1,824,264
GRAIN HEADER
Filed Jan. 3, 1930  3 Sheets-Sheet 1
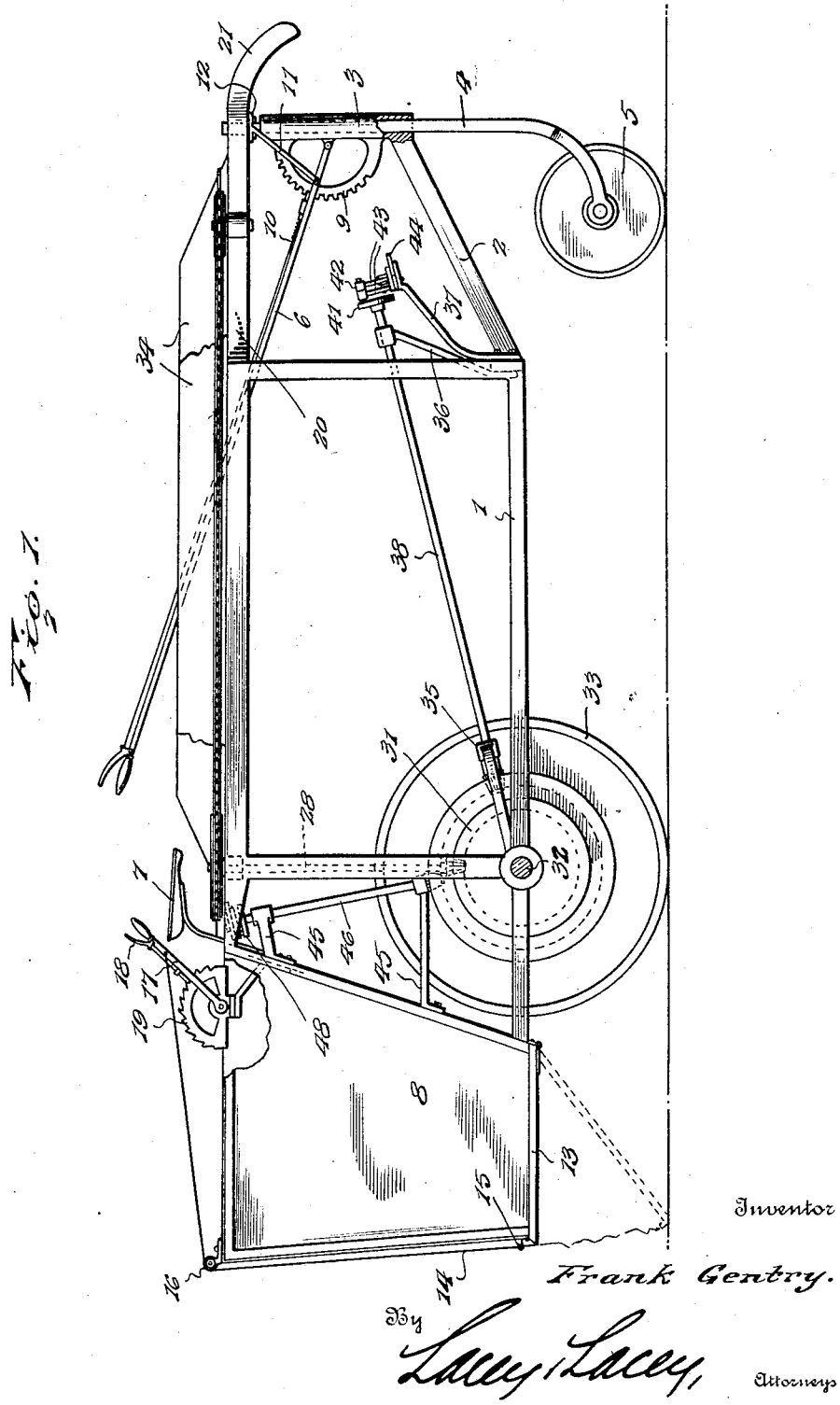
Inventor
Frank Gentry.
By Lacey Lacey, Attorneys

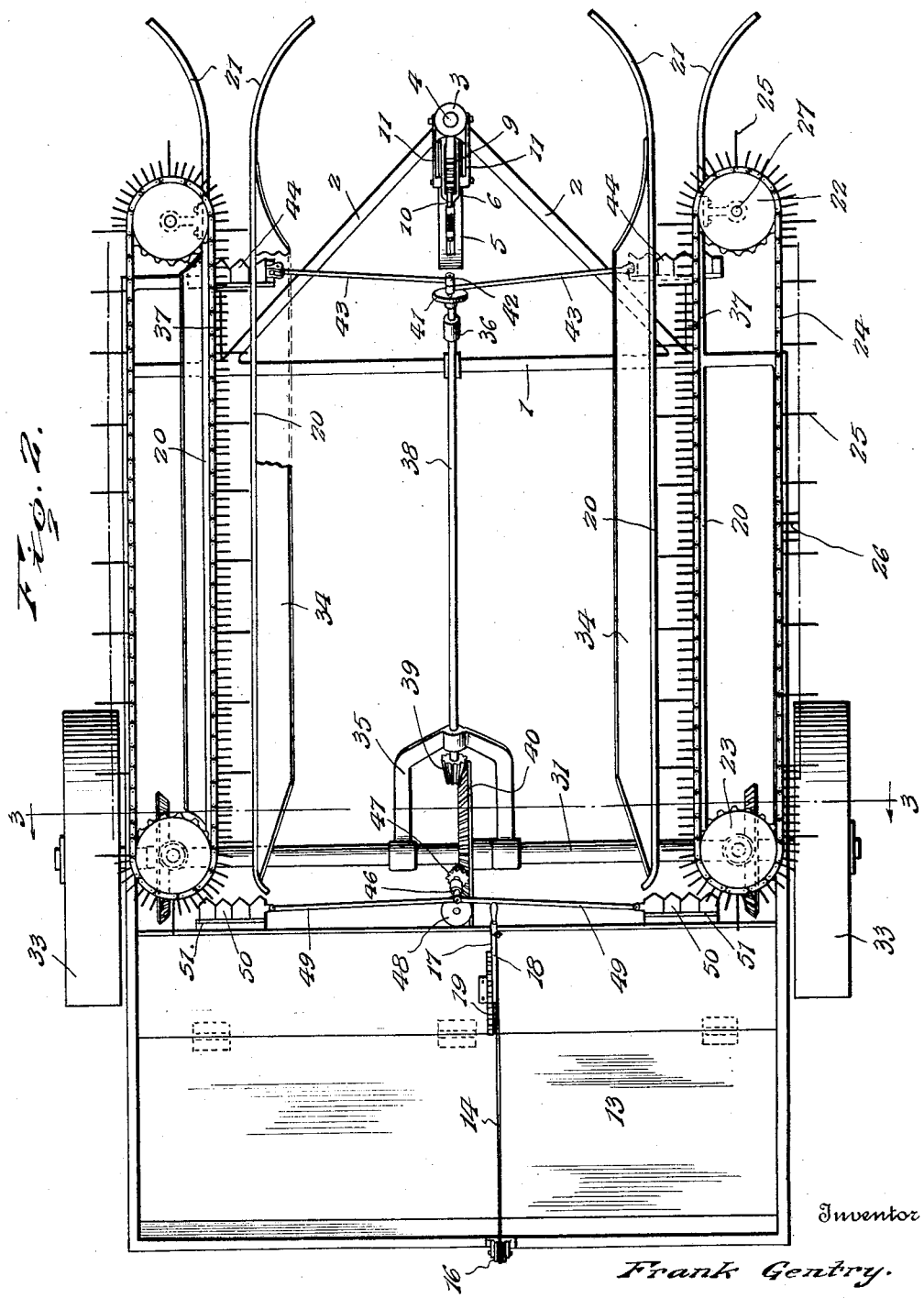

Sept. 22, 1931.　　　F. GENTRY　　　1,824,264
GRAIN HEADER
Filed Jan. 3, 1930　　　3 Sheets-Sheet 3
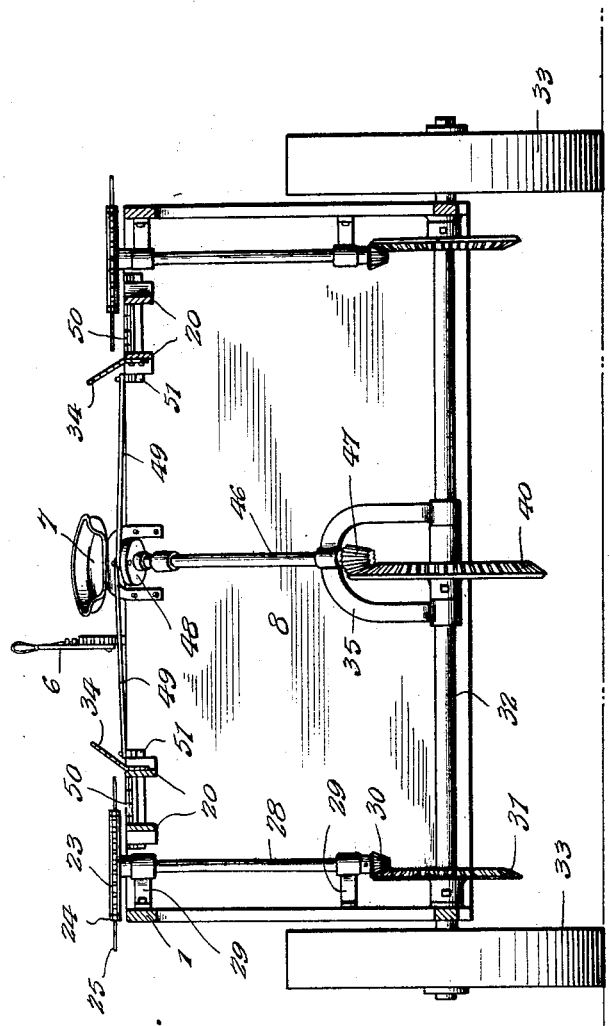
Inventor
Frank Gentry.
By Lacey & Lacey,
Attorneys Patented Sept. 22, 1931

1,824,264

UNITED STATES PATENT OFFICE

FRANK GENTRY, OF CARLSBAD, NEW MEXICO

GRAIN HEADER

Application filed January 3, 1930. Serial No. 418,330.

This invention has for its object the provision of a simple and inexpensive but strong and durable machine which may be drawn over a field and act upon two rows of standing grain simultaneously so as to remove the heads from the stalks and collect the heads for delivery at intervals in a bundle. The machine is designed more particularly for such crops as Kaffir corn but may, of course, be advantageously employed wherever crops grow with heads which may be severed from the stalks and subsequently converted into food. The invention is illustrated in the accompanying drawings and will be hereinafter first fully described and then more particularly defined in the appended claim.

In the drawings:

Figure 1 is a side elevation, partly broken away, of a machine embodying the present invention, Fig. 2 is a top plan view of the same, and Fig. 3 is a transverse section on the line 3—3 of Fig. 2.

In carrying out the invention, there is provided a main frame 1 consisting of upper and lower side bars and vertical posts or standards connecting the side bars and transverse bracing bars disposed between and rigid with the side bars at the front and at the rear. These several bars may be angle bars, channer bars or bars of rectangular cross section, the latter form being shown in the drawings as a matter of convenience. Projecting forwardly from the front end of the frame are converging braces 2 which merge at their front ends into the lower end of a vertically disposed sleeve 3 which constitutes the bearing for a vertical spindle 4 carrying a caster wheel or roller 5 at its lower end. Pivoted upon the sleeve 3 and extending upwardly and rearwardly therefrom is a lever 6 which terminates near the rear end of the frame where it may be easily reached and manipulated by the driver upon a seat 7, the seat being of any approved form and secured upon the front side of a box 8 at the top of said box. Formed integral with or rigidly secured to the sleeve 3 is a segmental rack 9 concentric with the pivot of the lever 6 and mounted upon the lever is a latch 10 of well known structure adapted to cooperate with the rack to hold the lever in a set position. Pivoted to the sides of the lever adjacent its fulcrum are links 11 which extend upwardly and have their upper ends pivoted to the opposite sides of a shoulder or collar 12 fixed upon the spindle 4 above the upper end of the bearing sleeve 3, as clearly shown in Fig. 1. By this described mechanism, the spindle 4 may be given vertical movement relative to the bearing sleeve 3 and thus set the roller or caster 5 at a higher or lower point relative to the frame and, consequently, adjust the frame to the height of the crop which is to be gathered. It will be noted that the braces 2 extend upwardly as well as forwardly and provide ample clearance for the caster in all positions in which it may be set so that the caster may swing freely and automatically conform to the path desired for the machine.

The box 8, which has been mentioned, is an open top receptacle rigidly secured in any convenient manner to the rear end of the main frame and having a bottom 13 which is hinged at its forward edge to the front side of the body of the box and is normally held in closed position, as shown in full lines in Fig. 1, a cable 14 being attached to a latch, indicated conventionally at 15, whereby the door or bottom will be normally supported but upon release of the latch will automatically drop to the position shown in dotted lines in Fig. 1 so as to discharge the accumulated crop. The cable 14 passes over an idler 16 on the upper rear corner of the box and then passes forward to a hand lever 17 fulcrumed on the box or on a bracket secured thereto and equipped with a latch 18 cooperating with a rack 19 so as to prevent accidental or premature release of the bottom. The lever 17 is situated close to the seat 7 so that it may be easily manipulated by the driver, as will be understood.

Extending longitudinally upon the top of the main frame adjacent each side thereof are guide rails 20 which project forwardly beyond the frame and have their front ends diverging, as shown at 21, whereby as the machine is drawn over the field the rails and their diverging front extremities will pass at opposite sides of the row of standing grain and direct the same into the space between the rails in an obvious manner. It will also be noted that the diverging extremities of these rails are turned downwardly so that a vertical area of engagement with the plants will be provided and the proper guiding of the same into the space between the rails will be effected. It is to be particularly noted that there are two of these guideways or paths for the crop provided on the machine so that the machine will simultaneously treat two standing rows of grain, being drawn by animals traveling in the space between the rows. At the outer side of each outer rail 20 and at the front and rear respectively of the machine, there are mounted sprocket wheels 22 and 23 which are operatively connected by sprocket chains 24 trained around them and provided at intervals with long projecting fingers 25 which are adapted to engage the severed heads with the portions of the stalks clinging thereto and feed them positively rearwardly between the guide rails, shorter teeth or fingers 26 being provided through the full length of the chains so as to properly support the severed stems or stalks. The front sprockets 22 are carried by stub shafts 27 mounted in the brackets provided upon the outer sides of the immediately adjacent guide rail while the rear sprockets are secured upon the upper ends of vertical shafts 28 mounted in bearing brackets 29 secured upon the adjacent standard or post of the main frame, as shown clearly in Fig. 3. The lower end of each shaft 28 is equipped with a beveled pinion 30 meshing with a beveled gear 31 fixed upon the axle 32 which is journaled in the main frame and is secured at its ends in ground wheels 33 which not only furnish the power for driving the working elements but also support the rear portion of the machine as is obvious. It will thus be seen that as the machine is drawn forward the sprocket chains 24 will be driven so that their inner runs will travel rearwardly and they will engage the stalks of the grain and gather them between the guide rails where they will be subjected to the action of the cutters. In order to aid in supporting the severed stalks with the heads thereon and prevent loss of the heads, inclined boards 34 are mounted upon the inner rails 21 and extend longitudinally thereof, as shown most clearly in Fig. 3. The fingers 25 and 26 of the gathering chains extend across the space between the guide rails 20 so that any tendency of the grain to fall away from the chain must cause it to tilt inwardly and the supports 34 prevent this tilting assuming such an excessive degree that the travel of the grain and the chains will be blocked or the grain will fall away from the chains.

A bearing bracket or frame 35 is fitted about the axle 31 at the center of the same and at the front of the main frame are brackets 36 and 37, a longitudinal shaft 38 being journaled in said brackets 35 and 36. The rear end of this shaft 38 is equipped with a beveled pinion 39 meshing with a beveled gear 40 secured upon the axle so that the rotation of the axle will be also transmitted to the shaft 38. Upon the front end of the shaft 38 is a crank disk 41 and pivoted upon the wrist pin of said crank disk, as indicated at 42, are the inner ends of pitmen 43 which extend laterally therefrom in opposite directions and are connected at their outer ends to reciprocating cutters 44. The cutters 44 are slidably mounted upon and guided by the forward ends of the brackets 37 respectively, and it will be seen at once that they reciprocate in unison. The cutters are of sufficient longitudinal extent to pass entirely across the area between the corresponding guide rails and as the machine is drawn forward these cutters 44 will sever the standing stalks below the tops thereof and leave the stalks suspended from the gathering chains with the heads thereon intact.

Mounted in bearings 45 provided therefor on the front side of the box and at the center of the same is a shaft 46 which is equipped at its lower end with a beveled pinion 47 meshing with the beveled gear 40, as shown in Figs. 2 and 3, and upon the upper end of this shaft 46 is secured a crank disk 48 having a wrist pin upon its upper side. Upon said wrist pin are pivotally mounted the inner ends of pitmen 49 which extend laterally therefrom in opposite directions and have their outer ends pivotally connected to reciprocating cutters 50 which are slidably mounted in suitable guides 51 secured upon the front side of the box 8. These cutters 50 are so disposed that they work in a plane close to but below the horizontal plane of the sprockets 23, as shown in Fig. 3, and they, therefore, cut through the stalks immediately below the heads of the grain and inasmuch as this action occurs immediately at the front of the open top box, the severed heads will fall over into the box and be permitted to accumulate therein.

From the foregoing description, taken in connection with the accompanying drawings, it will be seen that I have provided an exceedingly simple machine which may be built and operated at a slight cost and which will prove highly efficient in use. The stalks are first severed at a point well below the heads so that the stubble left standing in the field will not be so high as to interfere seriously with its subsequent cultivation. As the machine progresses, the severed stalks with the heads thereon are carried rearwardly and then a second cut is made so that the heads are freed and drop into the collecting box while the short portions of the stems and stalks are permitted to drop to the ground where they may be subsequently easily plowed in and utilized as fertilizer. The operating mechanism is free of complications so that it is not apt to get out of order and it may be readily inspected and cleaned or lubricated whenever such attention is necessary.

Having thus described the invention, I claim:

A grain header comprising a portable frame, grain gathering mechanism mounted on the frame, a shaft mounted centrally in the lower portion of the frame and extending longitudinally thereof, a second shaft arranged centrally of the frame and extending upwardly at the rear thereof, a crank at the front end of the first-mentioned shaft, a crank at the upper end of the second-mentioned shaft, reciprocatory cutters on the frame at the sides thereof, and pitmen connecting the cutters with the respective cranks.

In testimony whereof I affix my signature.

FRANK GENTRY. [L. S.]